US008803794B1

(12) United States Patent
Froment et al.

(10) Patent No.: US 8,803,794 B1
(45) Date of Patent: Aug. 12, 2014

(54) DETERMINING WHEN TO PERFORM A FLASH OF A DISPLAY

(75) Inventors: Arnaud M. Froment, San Jose, CA (US); Ezekiel Sanborn de Asis, Santa Clara, CA (US); Kirill V. Orlov, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 169 days.

(21) Appl. No.: 13/424,060

(22) Filed: Mar. 19, 2012

(51) Int. Cl.
*G06F 15/16* (2006.01)

(52) U.S. Cl.
USPC .......................................... 345/107; 345/214

(58) Field of Classification Search
USPC ............ 345/102, 107, 36, 48, 157–158, 210, 345/214; 315/169.3
See application file for complete search history.

(56) References Cited

U.S. PATENT DOCUMENTS

| | | | | |
|---|---|---|---|---|
| 7,719,511 | B2 * | 5/2010 | Huang | 345/102 |
| 2008/0278436 | A1 * | 11/2008 | Sato | 345/107 |

* cited by examiner

*Primary Examiner* — Andrew Sasinowski
(74) *Attorney, Agent, or Firm* — Lee & Hayes, PLLC

(57) ABSTRACT

Examples of when to perform a flash update to reset pixels of a display device are described. In some implementations, a counter may be modified in response to determining that one or more pixels of the display device have changed. An ambient temperature of the display device may be determined. A flash update of the display device may be performed based on the counter, the ambient temperature, or both.

27 Claims, 4 Drawing Sheets

DETERMINING WHEN TO PERFORM A FLASH OF A DISPLAY

BACKGROUND

A large and growing population of users enjoy entertainment through the consumption of digital content items (or simply "content items"), such as music, movies, images, electronic books, and so on. The users employ various computing devices to consume such content items. Among these computing devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance the user experience continues to be a priority.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
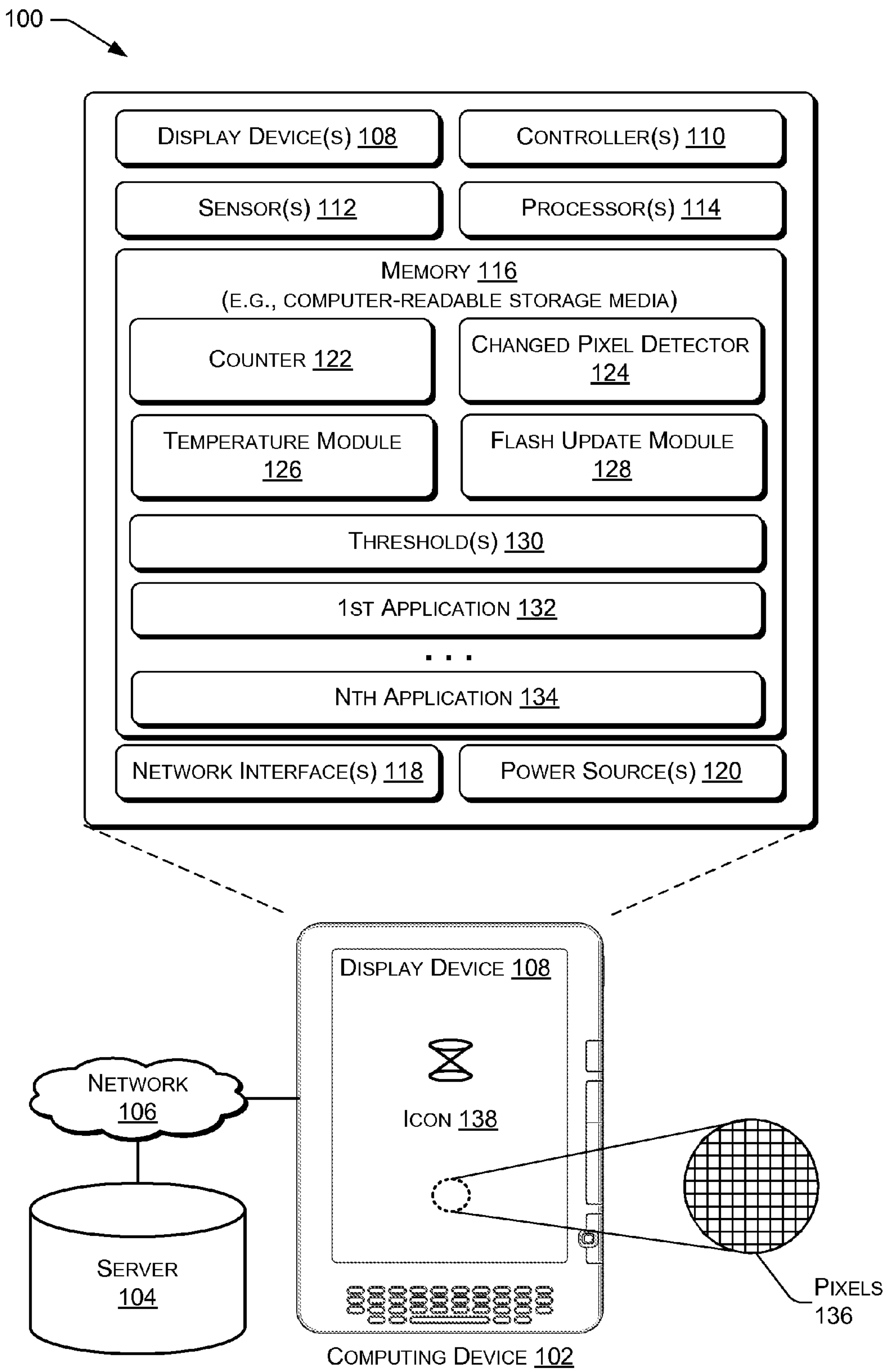
FIG. 1 is an illustrative architecture that includes a computing device capable of determining when to perform a flashing update of a display device according to some implementations.

Computing devices used to consume digital content items may include specialized types of display devices. For example, computing devices used to display electronic books (eBook) may use electronic paper display devices that mimic the characteristics of ink on paper by reflecting light rather than emitting light. Under certain conditions, these display devices may display residual images that are referred to as ghosting. Ghosting is a visual effect that may be perceived by someone viewing the display device. To address ghosting, the display device may be periodically flashed (also known as a flash update or screen flash update) to reset the pixels of the display. For example, in some cases, the flash update may turn every pixel of the display device white, then black, then white, to normalize the contrast of the pixels. However, the flash update may take a particular amount of time to perform, during which the user may be unable to view the display or interact with the computing device. In addition, the user may find frequent flash updates visually unappealing. Thus, when the user is interacting with the computing device, reducing how often the flash update is performed may improve the user's experience. The techniques described herein may use a counter (or other data structure) to track an amount of pixels that change in value over time. For example, the counter may be modified (e.g., incremented by one) each time a pixel changes from one value to another value in response to changes in content rendered on the display. When the counter satisfies a particular threshold (e.g., a pixel threshold), the flash update is performed. In this context, satisfies means that the counter may be greater than the threshold or less than the threshold. To illustrate, the flash update may be performed when the counter is greater than some percentage of the number of pixels in the display device. For example, if the display device is capable of displaying W×H pixels (where W is the width of the display in pixels and H is the height of the display in pixels), the flash update may be performed when the counter has a value that is at least 300%, 400%, 500%, or 600% of W×H. In some cases, most or all of the pixels in the display device may be included when counting the number of pixels that have changed. For example, if a particular pixel changes from a first value to a second value and then from the second value to a third value, the counter may be incremented each time the particular pixel changes value. In this example, the counter may be incremented when the particular pixel changes from the first value to the second value and may again be incremented when the particular pixel changes from the second value to the third value. The counter may be reset under certain conditions, such as after a flash update is performed.

To count the number of pixels that have changed in value over a period of time, various techniques may be used. For example, updates sent to the display device to modify the values of one or more of the pixels may be monitored to determine how many pixels are being modified. As another example, the values of the pixels of the display device may be scanned before an update is performed and stored. After the update is performed, the values of the pixels of the display device may be scanned and compared to the stored values to identify how many pixels have changed values. Of course, other techniques may be used to identify how many pixels have changed in value over a period of time.

In some cases, when counting pixels of a display device that have changed in value, a particular set of pixels may be excluded. To illustrate, the computing device may, under certain circumstances, display one or more icons. For example, when the computing device is performing a lengthy operation (e.g., an operation that takes more than a threshold amount of time to perform), the computing device may display an icon, referred to as a spinner icon, to indicate that the lengthy operation is being performed. To indicate that the operation is in progress, the spinner icon may be displayed at different rotational angles to give the icon the appearance of spinning around or utilize some other type of animation. As another example, a battery indicator icon may indicate a power level of a battery and may periodically change value if the power level drops below a particular threshold. As yet another example, a signal strength indicator may indicate a signal strength of a wireless communication between the computing device and a network. As another example, a download indicator may indicate an approximate amount of a file (e.g., a digital content item) that is being downloaded to the computing device from a remote server. Of course, the computing device may use other icons to indicate other related functions provided by the computing device. Because one or more of these icons may periodically change in value, the pixels that are used to display at least some of these icons may be excluded, in some cases, when incrementing the counter. To illustrate, when a spinner icon is being displayed, the pixels that include the spinner icon may be excluded when counting the number of pixels that have changed over a period of time. Thus, a particular set of pixels may be excluded when counting changed pixels because certain icons, such as the spinner icon, may change more frequently compared to the rest of the pixels in the display device. Excluding the particular set of pixels may prevent the counter from being influenced by updates to the particular set of pixels (e.g., icons), thereby reducing the number of flash updates that are performed. In contrast, if the particular set of pixels (e.g., icons) were included, more frequent flash updates may be performed, thereby adversely affecting a user's experience when viewing content.

In some situations, two or more screen updates may be sent within a short period of time to a display of the computing device. For example, a first screen update may be sent to the display and a second screen update may be sent to the display before the first screen update has completed. In some implementations, the time taken to complete a screen update may vary between 100 milliseconds (ms) and 1000 ms, depending on the visual quality of the screen update. For example, when displaying an eBook, the computing device may receive two or more page turn commands from a user and, in response, send two or more screen updates to the display device. As another example, a pop-up window may open within a short period of time after the user navigates to particular content (e.g., a particular page of an EBook, a particular portion of a website, and the like). In situations where two or more screen updates are sent to the display device within a predetermined period of time, the updates are said to overlap when both updates make changes to a common set of pixels. When counting the number of pixels that have changed, the common set of pixels in the overlapping updates may be counted once. Otherwise, the common set of pixels might be counted twice; once when updated by the initial screen update and again when updated by the subsequent screen update. For example, a first update may include an instruction to change a particular pixel to a first value while a second update, sent shortly after the first update, may include an instruction to change the particular pixel to a second value. In this example, the updates overlap because both updates change a common pixel, e.g., the particular pixel. Thus, the value of the particular pixel may change to the first value and then shortly thereafter to the second value. Because the updates overlap, the counter may be incremented by one rather than two, even though the particular pixel changes value twice (e.g., to the first value and then to the second value).

In addition to the amount of pixel changes, the threshold for determining when to perform a flash update of the display may be determined with reference to one or more other factors, such as an ambient temperature of the display. The term ambient temperature refers to a temperature that surrounds at least part of the display device. The ambient temperature may be measured by one or more sensors located near the display device, such as in a housing of the display device or in a housing of the computing device. In this regard, certain types of display devices, such as electronic paper display devices, may have a particular operating temperature range. For example, a display device may have certain characteristics when an ambient temperature surrounding the display device is between X (e.g., 10° Celsius) and Y (e.g., 30° Celsius). When the display device is used in environments where the ambient temperature is below X or above Y, the characteristics of the display devices may change. For example, for some display devices, particular visual effects (e.g., ghosting) may be more noticeable when the ambient temperature is below X or above Y. To reduce ghosting in such situations, the computing device may measure the ambient temperature of the display device and determine when to perform a flash update based at least partially on the ambient temperature. For example, how often a flash update is performed may be modified based on how many degrees the ambient temperature is below X or above Y. To illustrate, the flash update may be performed more frequently when the ambient temperature is below X or above Y.

In some implementations, how frequently the flash update is performed may be modified by changing the particular threshold that is used to determine when to perform the flash update. For example, when the ambient temperature is between X and Y, a flash update may be performed when the counter indicates that the number of pixels that have changed is greater than 600% of the total number of pixels in the display (e.g., W×H). When the ambient temperature is below X or above Y, the threshold may be modified such that a flash update is performed when the counter indicates that the number of pixels that have changed is greater than 400% of the total number of pixels in the display. In other words, when the ambient temperature is below X or above Y, the threshold may be changed from a first percentage (e.g., 600%) to a second percentage (e.g., 400%) to cause flash updates to be performed more frequently. Of course, in other implementations, other mechanisms may be used to vary the frequency at which flashing updates are performed relative to the ambient temperature surrounding the display device. For example, when the ambient temperature is below M (e.g., below 9.9° C.), a first threshold (e.g., 400%) may be selected, between M and N (e.g., 10° to 19.9° C.) a second threshold (e.g., 500%) may be selected, between N and P (e.g., 20° to 39.9° C.) a third threshold (e.g., 600%) may be selected, and above P (e.g., above 40° C.) the first threshold or the second threshold may be selected. As another example, the threshold may vary continuously based on the ambient temperature. To illustrate, the ambient temperature may be determined and a formula based on the ambient temperature may be used to calculate the threshold.

Visual effects, such as ghosting, may also be more perceptible to a user when a large image is displayed on the display device. To reduce ghosting, when a size of an image (e.g., in terms of the number of pixels used to display the image) satisfies a size threshold, a flash update may be performed prior to or as part of rendering the image on the display device.

The counter used to indicate how many pixels have changed may be reset under certain conditions. For example, the counter may be reset after a flash update is performed. As another example, the counter may be reset when a screen update changes more than a predetermined number of pixels of the display device to white pixels. As another example, the counter may be reset when a flash update is performed by an application.

Firmware or software (e.g., an operating system) of the computing device may determine when to perform flash updates, thereby relieving application programmers from writing applications that determine when to perform flash updates. Thus, determining when to perform the flash updates may be transparent and outside the purview of applications that are executing on the computing device. Application programmers may write applications to provide various functions without having to take into consideration visual effects such as ghosting. Of course, application programmers may write applications that perform flash updates to achieve a desired effect rather than to reduce ghosting. Reducing ghosting enables a user of the computing device to have a smoother user experience. In addition, by reducing how often flash updates are performed, the user may encounter fewer interruptions.

Illustrative Architecture

FIG. 1 is an illustrative architecture that includes a computing device capable of determining when to perform a flashing update of a display device according to some implementations. The system 100 includes a computing device 102 coupled to a server 104 via a network 106. The server 104 may include a storefront that enables the acquisition (e.g., purchase, rental, and the like) of digital content items for consumption by the computing device 102. In addition, the server 104 may provide cloud-based services, including storing digital content items that may be consumed by the computing device 102. The network 106 may include one or more networks, such as a wireless local area network (e.g., WiFi®), a wireless wide area network (e.g., a code division multiple access (CDMA) or a global system for mobile (GSM) network), a wired network (e.g., Ethernet), other type of network, or any combination thereof.

The computing device 102 may include a display device 108, one or more controllers 110, one or more sensors 112, one or more processors 114, a memory 116, one or more network interfaces 118, and one or more power sources 120.

Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display.

In one implementation, the display device 108 may be an electronic paper display. The electronic paper display may comprise an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray.

Of course, while one example has been given, it is to be appreciated that the electronic paper displays described herein may comprise any other type of electronic paper technology, such as gyricon displays, electrowetting displays, electrofluidic displays, interferometric modulator displays, cholestric liquid crystal displays, and the like. These displays may be capable of rendering grayscale images or, in some instances, may be capable rendering color images.

The controllers 110 may include a display controller to control the display device 108. For example, the display controller may be capable of instructing one or more of the display devices 108 to perform a flash update. The sensors 112 may include one or more temperature sensors to determine an ambient temperature surrounding the display device 108. The network interfaces 118 may be capable of coupling the computing device 102 to the server 104 via the network 106. For example, the network interfaces 118 may include one or more wireless interfaces, such as a wireless interface compliant with a wireless wide area network standard (e.g., CDMA or GSM) or a wireless local area network standard, such as WiFi®.

The memory 116 may include computer-readable storage media, such as volatile memory, non-volatile memory, removable memory, and/or non-removable memory, implemented in any method or technology for storage of information, such as computer-readable instructions, data structures, program modules, or other data. Also, the processor(s) 114 may include onboard memory in addition to or instead of the memory 116. Examples of storage media that may be included in the memory 116 and/or processor(s) 114 include, but are not limited to, non-transitory media, such as random access memory (RAM), read only memory (ROM), electrically erasable programmable read only memory (EEPROM), flash memory or other memory technology, compact disk (CD-ROM), digital versatile disks (DVD) or other optical storage, magnetic tape, magnetic disk storage or other magnetic storage devices, or any other medium which can be used to store the desired information and which can be accessed by the processor(s) 114. Any such computer-readable storage media may be part of the computing device 102. The memory 116 may include software programs or other executable modules that may be executed by the processor(s) 114.

The memory 116 may include a counter 122, a changed pixel detector 124, a temperature module 126, a flash update module 128, one or more thresholds 130, and one or more applications, such as a first application 132 up to an Nth application 134. The one or more thresholds 130 may include a pixel threshold, one or more temperature thresholds, an image size threshold, a white pixel threshold, and the like. For example, when the number of pixels that have changed over a period of time satisfy the pixel threshold, a flash update may be performed. As another example, when a image to be rendered on the display satisfies the image size threshold, a flash update may be performed. As yet another example, when the number of pixels that are changed to white pixels by a particular screen update satisfy the white pixel threshold, a flash update may be performed. As another example, how often a flash update is performed may change based on an ambient temperature of the display device 108. To illustrate, the temperature module 126 may determine an ambient temperature of the display device 108 using one or more of the sensors 112 (e.g., temperature sensors) and modify one of the thresholds 130 (e.g., a pixel threshold) based on the ambient temperature. Modifying one of the thresholds 130 may cause the flash update module 128 to perform a flash update of the display device 108 more frequently when the ambient temperature is below a first temperature threshold or above a second temperature threshold.

The changed pixel detector 124 may use the counter 122 to keep track of how many pixels 136 of the display devices 108 have changed in value over time (e.g., from a first point in time). At least a portion of the pixels of the display devices 108 may be monitored, and the counter may be modified based on a number of the monitored pixels that change in value. The changed pixel detector 124 may periodically reset the counter 122 in response to detecting particular events. For example, the changed pixel detector 124 may reset the counter 122 after performing a flash update.

The temperature module 126 may be capable of determining an ambient temperature of the display device 108. The flash update module 128 may determine when to perform a flash update of the display device 108 based on the counter 122 and/or based on an ambient temperature. Though not shown in FIG. 1, the memory 116 may include an operating system, low level device drivers associated with the computing device 102, other software or firmware, or any combination thereof.

In operation, the changed pixel detector 124 may monitor the data values associated with the pixels 136 of the display device 108. In response to detecting that one or more of the pixels 136 have changed in value (e.g., from a first grayscale level to a second grayscale level), the changed pixel detector 124 may modify (e.g., increment) the counter 122. The flash update module 128 may perform a flash update of the display device 108 in response to determining that the counter 122 satisfies a particular pixel threshold.

In some implementations, the changed pixel detector 124 may exclude pixels that are used to display icons (e.g., icon 138) when determining which of the pixels 136 have changed data values. The icon 138 may be a spinner icon or other icon that is used to indicate when the computing device 102 is performing a lengthy operation. Thus, when determining how many pixels have changed data values, the pixel detector 124 may exclude the data values of pixels of the display device 108 that display particular icons, such as a spinner icon, a signal strength indicator icon, a power level indicator icon, or other type of icon in addition to or instead of the icon 138.

When two or more updates are made within a predetermined period of time, the changed pixel detector 124 may determine whether the updates overlap and whether the overlapping updates change the data values of a common set of pixels. If the updates overlap, the changes in data values to the common set of pixels may be counted once. For example, a first update may change a pixel from white to black and a second update that occurs soon after the first update may change the pixel from black to white. In this situation, the changed pixel detector 124 may not count the pixel as a changed pixel because the second update caused the pixel to revert back to its original value (e.g., white). As another example, a first update may specify that a pixel change to black and a second update that occurs soon after the first update may specify that the pixel change to black. In this situation, the changed pixel detector 124 may count the pixel as one changed pixel because both updates caused the pixel to change to the same value (e.g., black).

The flash update module 128 may determine when to perform a flash update of the display device 108 based on the counter 122 and based on the ambient temperature of the display device 108. In some implementations, the temperature module 126 may modify one or more of the thresholds 130 based on the ambient temperature. For example, when the ambient temperature is below a first temperature threshold or above a second temperature threshold, the temperature module 126 may modify a pixel threshold that is used by the flash update module 128 to determine when to perform a flash update. Modifying the pixel threshold may cause the flash update module 128 to perform a flash update more frequently when the ambient temperature is below the first temperature threshold or above the second temperature threshold.

In some implementations, when an image is being displayed on the display device 108, the flash update module 128 may determine a size of the image that is being displayed. If the size of the image that is being displayed satisfies a size threshold, the flash update module 128 may perform a flash update of the display device 108 before or as part of rendering of the image. For example, if the size of the image that is being displayed is greater than N pixels, the flash update module 128 may perform a flash update of the display device 108 before or as part of rendering the image on the display device 108.

The counter 122 may be reset under certain conditions. For example, the counter 122 may be reset after a flash update is performed. As another example, the counter 122 may be reset when a screen update changes more than a predetermined number of pixels of the display device 208 to white pixels. As another example, the counter 122 may be reset when a flash update resets the data values of more than a predetermined number of pixels of the display device 108. For example, one of the applications 132, 134 may perform a flash update that resets at least a portion of the data values of the pixels 136 of the display device 108. If the flash update resets the data values of more than a predetermined number of pixels of the display device 108, the flash update module 128 may reset the counter 122.

Thus, the flash update module 128 may perform a flash update of the display device 108 based on the counter 122, based on an ambient temperature of the display device 108, or both. Performing flash updates based on the number of changed pixels and/or the ambient temperature may reduce visual effects (e.g., psycho-visual effects), such as ghosting. In addition, performing flash updates based on the number of pixels that have changed in value and/or the ambient temperature may decrease how often flash updates are performed, thereby providing a smoother experience for a user of the computing device 102.

Various processes, instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processor(s) 114, as hardware, and/or as firmware. Typically, the functionality of the program modules may be combined or distributed as desired in various embodiments. An implementation of these modules and techniques may be stored on or transmitted across some form of computer-readable media.

The modules stored in the memory 116 may be implemented across one or more servers in a cloud computing environment, on a local device, or on a combination of both. The following discussion does not limit the implementation of the modules stored in the memory 116 to any particular device or environment.

Furthermore, while FIG. 1 sets forth an example of a suitable architecture to determine when to perform a flash update of a display device, numerous other possible architectures, frameworks, systems and environments will be apparent to those of skill in the art in view of the disclosure herein. Additionally, while the examples herein have been described in the environment of a grayscale display device, other implementations may be directed to other types of display devices, such as color display devices, three-dimensional (3D) display devices, and the like.

Example Processes

In the flow diagrams of FIGS. 2-6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200, 300, 400, 500, and 600 are described with reference to the architecture 100, as described above, although other models, frameworks, systems and environments may implement these processes.

Figure 2:
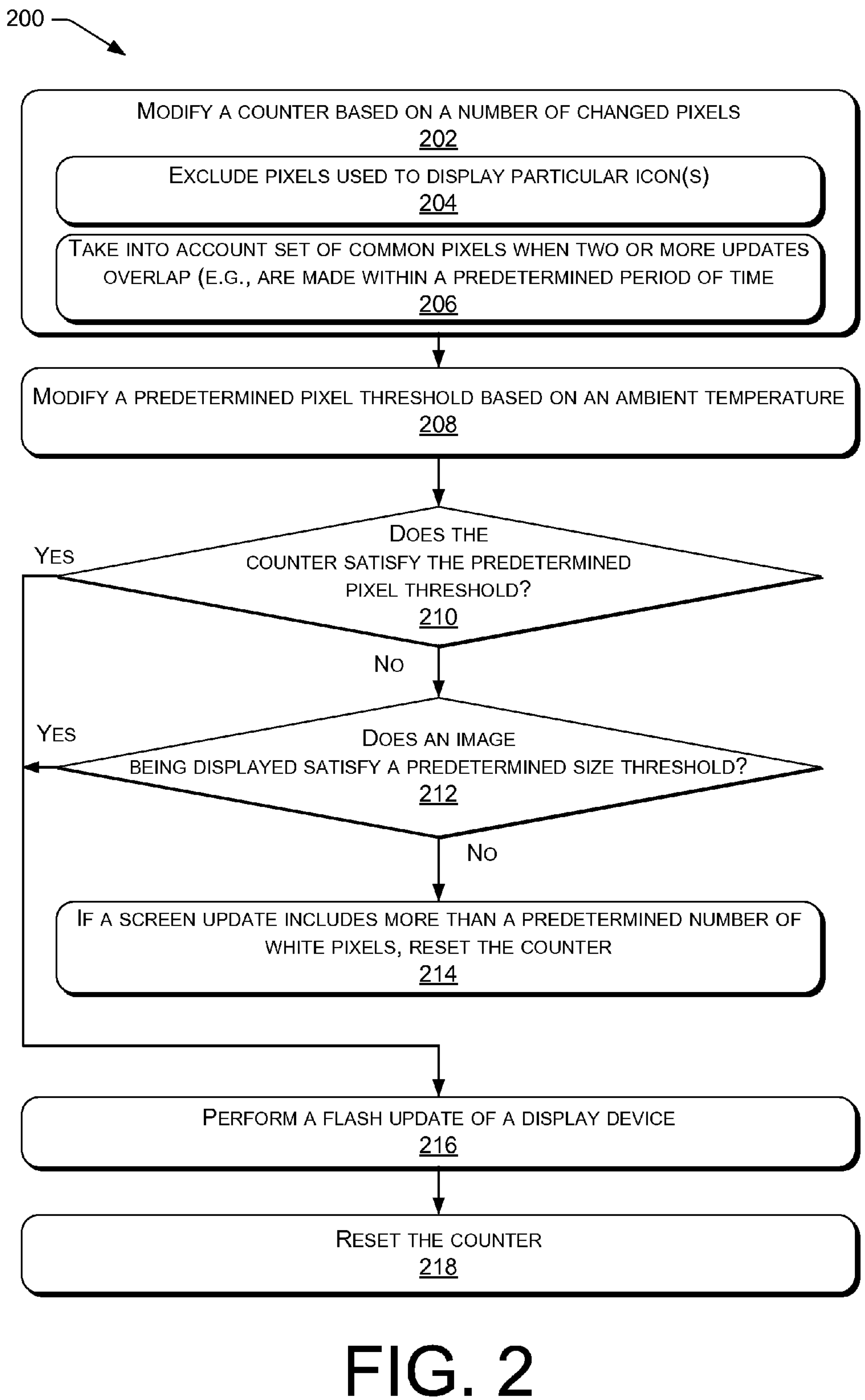
FIG. 2 is a flow diagram of an example process that includes performing a flashing update according to some implementations.

FIG. 2 is a flow diagram of an example process 200 that includes performing a flashing update according to some implementations. The process 200 may be performed by one or more of the software components, the firmware components, or the hardware components of the computing device 102.

At 202, a counter is modified based on a number of pixels that have changed in value ("changed pixels"). For example, in FIG. 1, the changed pixel detector 124 may monitor the data values of pixels 136 of the display device 108. The changed pixel detector 124 modify the counter 122 based on a number of the pixels 136 of the display device 108 that have changed from a first value to a second value that is different from the first value, e.g., from black to white, from white to black, from one grayscale level to another grayscale level, from one color to another color, and the like.

At 204, pixels used to display specified icons may be excluded when counting the number of pixels that have changed. For example, in FIG. 1, the changed pixel detector 124 may exclude the data values of pixels used to display one or more icons, such as the icon 138, when determining how many of the pixels 136 have changed data values.

At 206, when two or more updates are made within a predetermined period of time and are considered to be overlapping updates, a common set of pixels from the two or more overlapping updates may be taken into consideration when determining the number of pixels that the changed. For example, in FIG. 1, when two or more updates are made to the display device 108 within a pre-determined period of time, the changed pixel detector 124 may take into account a common set of pixels that change values as a result of the two or more updates when modifying the counter 122.

At 208, a predetermined pixel threshold may be modified based on an ambient temperature. For example, in FIG. 1, the temperature module 126 may use one or more of the sensors 112 to determine an ambient temperature of the display device 108. When the ambient temperature satisfies one or more of the thresholds 130 (e.g., when the ambient temperature is below a first temperature threshold or below a second temperature threshold), the temperature module 126 may modify a predetermined pixel threshold. Modifying the predetermined pixel threshold may result in the flash update module 128 performing a flash update to the display device 108 more frequently.

At 210, a determination may be made whether the counter satisfies a predetermined pixel threshold. For example, in FIG. 1, the flash update module 128 may determine whether the counter 122 satisfies a predetermined pixel threshold (e.g., of the thresholds 130).

If the determination is yes (e.g., the counter satisfies the predetermined pixel threshold), at 210, a flashing update is performed, at 216. For example, in FIG. 1, if the flash update module 128 determines that the counter 122 satisfies the predetermined pixel threshold, the flash update module 128 may instruct one of the controllers 110 (e.g., a display controller) to perform a flash update of the display device 108.

If the determination is no (e.g., the counter does not satisfy the predetermined pixel threshold), at 210, a determination is made whether an image being displayed satisfies a predetermined size threshold, at 212. For example, in FIG. 1, the flash update module 128 may determine whether an image to be rendered on the display device 108 satisfies a predetermined size threshold (e.g., of the thresholds 130). If the determination is yes (e.g., the image being displayed satisfies a predetermined size threshold), at 212, the flashing update is performed, at 216, and the counter is reset, at 218. For example, in FIG. 1, in response to determining that an image displayed by the display device 108 satisfies a predetermined size threshold, the flash update module 128 may instruct one of the controllers 110 (e.g., a display controller) to perform a flash update of the display device 108.

If the determination is no (e.g., the image being displayed does not satisfy the predetermined size threshold), at 212, if a screen update changes the data values of more than a predetermined number of white pixels, the counter may be reset, at 214. For example, in FIG. 1, the changed pixel detector 124 may reset the counter 122 under particular conditions. To illustrate, the counter 122 may be reset when a screen update causes more than a predetermined number of the pixels 136 to change to white pixels. As another illustration, the counter 122 may be reset when a flash update is performed in response to a request from an application.

After performing a flashing update, at 216, the counter may be reset at 218. For example, in FIG. 1, the flash update module 128 may reset the counter 122 after performing a flash update of the display device 108.

Thus, a flash update of a display device may be performed based on a counter that indicates a number of pixels of a display device that have changed data values over time, based on an ambient temperature of the display device, or both. Performing flash updates based on the number of changed pixels and/or the ambient temperature may appropriately balance the desire to reduce visual effects, such as ghosting, while avoiding more flash updates than needed, thereby providing a smoother user experience.

Figure 3:
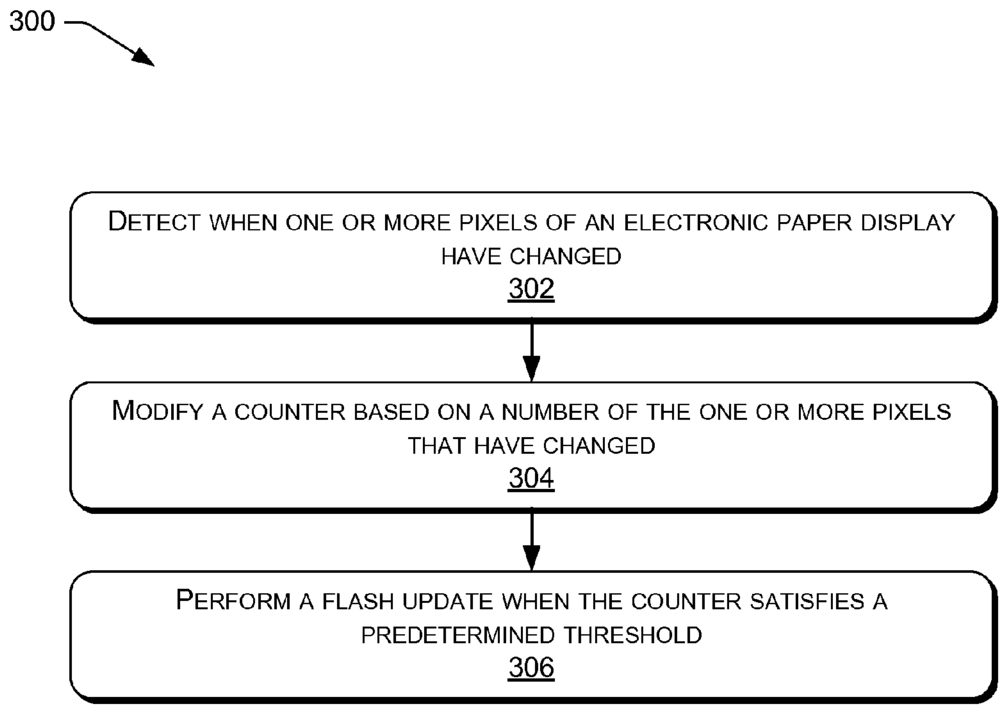
FIG. 3 is a flow diagram of an example process that includes detecting when one or more pixels of an electronic paper display have changed for the purpose of determining when to perform a flashing update on the display.

FIG. 3 is a flow diagram of an example process 300 that includes detecting when one or more pixels of an electronic paper display have changed data values according to some implementations. The process 300 may be performed by one or more of the software components, the firmware components, or the hardware components of the computing device 102.

At 302, a component of the computing device 102 may detect when one or more pixels of an electronic paper display have changed data values. For example, in FIG. 1, the changed pixel detector 124 may detect when one or more of the pixels 136 of the display device (e.g., an electronic paper display device) that have changed in value.

At 304, a counter may be modified based on a number of the one or more pixels that have changed in value. For example, in FIG. 1, the changed pixel detector 124 may modify the counter 122 based on a number of the pixels 136 that have changed in value.

At 306, a flashing update may be performed when the counter satisfies a predetermined threshold. For example, in FIG. 1, the flash update module 128 may instruct one of the controllers 110 (e.g., a display controller associated with the display device 108) to perform flashing update of the display device 108 in response to determining that the counter 122 satisfies one of the thresholds 130 (e.g., a pixel threshold).

Figure 4:
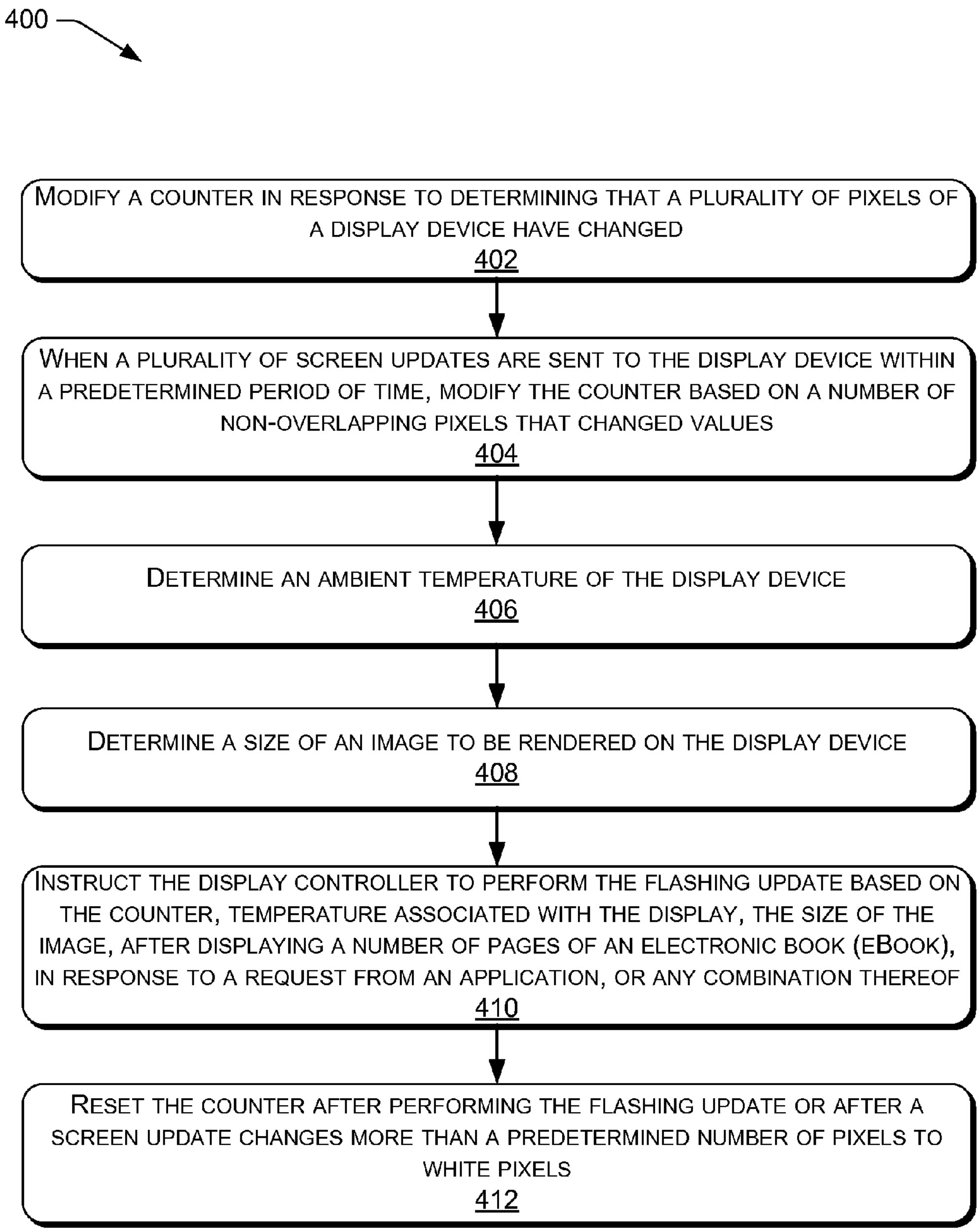
FIG. 4 is a flow diagram of an example process that includes modifying a counter in response to determining that a plurality of pixels of a display device have changed according to some implementations.

FIG. 4 is a flow diagram of an example process 400 that includes modifying a counter in response to determining that a plurality of pixels of a display device have changed according to some implementations. The process 400 may be performed by one or more of the software components, the firmware components, or the hardware components of the computing device 102.

At 402, a counter is modified in response to determining that a plurality of pixels of a display device has changed in value. For example, in FIG. 1, the changed pixel detector 124 may modify the counter 122 based on a number of the pixels 136 of the display device 108 that have changed from one value (e.g., a first grayscale level) to another value (e.g., a second grayscale level). In some implementations, pixels used to display one or more specified icons (e.g., spinner icon, battery/power icon, signal strength icon, and the like) may be excluded when determining which pixels of the display device have changed in value.

At 404, when a plurality of screen updates are sent to the display device within a predetermined period of time, the counter may be modified based on a common set of pixels that have changed in value. For example, when two or more screen updates are sent to a display device within a short period of time, the common set of pixels affected by the two or more screen updates may be identified and the counter may be modified based on a number of pixels in the common set of pixels that changed values. The common set of pixels changed by the overlapping updates may be counted once rather than twice.

At 406, an ambient temperature of the display device may be determined. For example, in FIG. 1, the temperature module 126 may use one or more of the sensors 112 to determine an ambient temperature of at least a portion of the display device 108. To illustrate, when the ambient temperature falls below a first temperature threshold or above a second temperature threshold, the display device 108 may be more prone to visual effects, such as ghosting. To reduce the amount of ghosting when the ambient temperature falls below a first temperature threshold or above a second temperature threshold, the flash update module 128 may perform a flash update more frequently as compared to when the ambient temperature is above the first threshold or below the second threshold. For example, when the ambient temperature falls below a first temperature threshold or above a second temperature threshold, the flash update module 128 may perform a flash update when the number of pixels that change in value is greater than 400% of the total number of pixels (e.g., W×H) in the display rather than 600% of the total number of pixels.

At 408, a size of an image to be rendered on the display device may be determined. For example, in FIG. 1, the flash update module 128 may determine a size of an image to be rendered on the display device and determine whether the size is greater than a predetermined number of pixels.

At 410, a display controller may be instructed to perform a flashing update based on (1) the counter (e.g., how many pixels have changed in value), (2) the ambient temperature of the display device (e.g., a threshold used to determine how often to perform a flash update may be modified based on the ambient temperature or a formula to determine how often to perform a flash update may include the ambient temperature), (3) the size of the image, (4) a number of page turns of an eBook, (5) in response to a request from an application, or any combination thereof. For example, in FIG. 1, the flash update module 128 may perform a flash update to the display device 108 based on the counter 122, an ambient temperature of the display device 108, a size of an image to be rendered to the display device 108, a number of pages that have been displayed (e.g., two, four, six, eight, and the like) of an eBook, in response to a request from one of the N applications 132, 134, or combinations thereof. In some cases, a weighted formula that includes the various factors (e.g., changed pixel counter, temperature associated with the display, image size, a number of pages of an eBook that have been displayed, application request, and the like) may be used to determine when to perform a flash update. For example, a request from an application to perform a flash update may be given more weight than the other factors. As another example, the number of pages of an eBook that have been displayed may be weighted more than the changed pixel counter, resulting in a flash update being performed after a predetermined number of pages have been displayed, regardless of whether the changed pixel threshold satisfies the predetermined pixel threshold.

At 412, the counter may be reset after performing a flashing update or after a screen update changes the values of more than a predetermined number of pixels to white pixels. For example, in FIG. 1, the counter 122 may be reset after performing a flashing update or in response to determining that a screen updated changed more than a particular percentage (e.g., fifty-percent, seventy-percent, and the like) of the total number of pixels (e.g., W×H) of the display device 108 to white pixels.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An electronic book (eBook) reader device comprising:
- an electronic paper display device;
- a display controller;
- one or more processors; and
- non-transitory computer-readable storage media comprising instructions executable by the one or more processors to perform acts comprising:
  - receiving, by the display controller, a plurality of updates;
  - in response to determining that the plurality of updates were received by the display controller within a predetermined period of time, identifying a common set of pixels being changed by the plurality of updates;
  - modifying a counter based on a number of the common set of pixels;
  - instructing the electronic paper display device to perform a flash update when the value of the counter satisfies a changed pixel threshold.

2. The eBook reader device of claim 1, wherein the value of the counter satisfies the changed pixel threshold when the value of the counter exceeds the changed pixel threshold.

3. The eBook reader device of claim 1, the acts further comprising:
- modifying the changed pixel threshold based on a temperature associated with the electronic paper display device.

4. A method performed by one or more processors executing instructions stored in a non-transitory computer-readable storage media, the method comprising:
- in response to determining that a plurality of updates were sent to an electronic paper display within a predetermined period of time, detecting changes caused by the updates to values of one or more pixels of the electronic paper display;
- modifying a counter based on a number of the values that have changed;
- determining when the value of the counter satisfies a changed pixel threshold; and
- performing a flash update of the electronic paper display at least partly in response to determining that the value of the counter satisfies the changed pixel threshold.

5. The method of claim 4, further comprising, prior to the performing of the flash update:
- determining a temperature associated with the electronic paper display; and performing the flash update of the electronic paper display based at least in part on the temperature associated with the electronic paper display.

6. The method of claim 4, wherein detecting changes caused by the updates to the values of the one or more pixels of the electronic paper display comprises ignoring changes to the values of pixels of a specified region of the electronic paper display.

7. The computing device of claim 4, wherein the changed pixel threshold is based at least in part on an amount of the one or more pixels of the electronic paper display.

8. A computing device comprising:

a display device;

a display controller to perform updates to the display device;

one or more processors; and non-transitory computer-readable media comprising instructions executable by the one or more processors to perform acts comprising:

in response to determining that a plurality of screen updates were sent to the display controller within a predetermined period of time, determining whether the plurality of screen updates modified a common set of pixels;

in response to determining that the plurality of screen updates modified the common set of pixels, modifying a value of a counter based on a number of the common set of pixels; and instructing the display controller to perform a flashier update when the value of the counter satisfies a changed pixel threshold.

9. The computing device of claim 8, wherein determining that the plurality of screen updates modified the common set of pixels comprises determining when each value of the common set of pixels has changed from a first value to a second value that is different from the first value.

10. The computing device of claim 8, wherein determining that the plurality of screen updates modified the common set of pixels comprises:

determining a portion of the display device used to display a predetermined icon;

determining a remainder of the display device that excludes the portion that displays the predetermined icon; and determining the common set of pixels modified by the plurality of screen updates in the remainder of the display device.

11. The computing device of claim 8, wherein the changed pixel threshold comprises a percentage of a total number of pixels of the display device.

12. The computing device of claim 8, wherein the acts further comprise:

measuring a temperature associated with the display device; and instructing the display controller to perform the flashing update when the temperature satisfies a temperature threshold.

13. The computing device of claim 8, wherein the acts further comprise instructing the display controller to perform the flashing update after displaying a predetermined number of pages of an electronic book (eBook).

14. The computing device of claim 8, wherein the acts further comprise resetting the value of the counter after performing the flashing update.

15. The computing device of claim 8, wherein the acts further comprise instructing the display controller to perform the flashing update at least partly in response to determining that an image greater than a predetermined size is to be rendered on the display device.

16. The computing device of claim 8, wherein the acts further comprise instructing the display controller to perform the flashing update in response to determining that a screen update of the display device changed more than a predetermined number of pixels to a particular value.

17. Non-transitory computer-readable storage media comprising instructions executable by one or more processors to perform acts comprising:

in response to determining that a plurality of updates were sent within a predetermined period of time to an electronic paper display, determining whether a common set of pixels were changed by the plurality of updates;

in response to determining that the common set of pixels were changed by the plurality of updates, modifying a value of a counter based on a number of the common set of pixels; and performing a flashing update of the electronic paper display at least partly in response to determining that the value of the counter satisfies a pixel threshold.

18. The non-transitory computer-readable storage media of claim 17, the acts further comprising:

modifying the pixel threshold based on a temperature associated with a display device, wherein modifying the pixel threshold based on the temperature causes the flashing update to be performed more frequently when the temperature is above a first temperature threshold or below a second temperature threshold.

19. The non-transitory computer-readable storage media of claim 17, wherein determining that the common set of pixels were changed by the plurality of updates comprises identifying updates of the plurality of updates that change values of pixels of the electronic paper display excluding pixels of a particular portion of the electronic paper display.

20. The non-transitory computer-readable media of claim 17, wherein the acts further comprise performing the flashing update of the electronic paper display at least partly in response to determining that a size of a grayscale image to be rendered on the electronic paper display is greater than a particular size.

21. The non-transitory computer-readable media of claim 20, wherein the flashier update is performed before or as part of rendering the grayscale image on the electronic paper display.

22. The non-transitory computer-readable storage media of claim 17, the acts further comprising:

determining a temperature associated with the electronic paper display;

in response to determining that the temperature satisfies a temperature threshold, modifying the pixel threshold based on the temperature.

23. An electronic book reader comprising:

a display controller;

an electronic paper display device responsive to the display controller;

one or more processors; and non-transitory computer-readable media including instructions executable by the one or more processors to perform acts comprising:

receiving, by the display controller, a plurality of updates for the electronic paper display device;

in response to determining that the plurality of updates were received by the display controller within a predetermined period of time, identifying a common set of pixels being changed by the plurality of updates;

modifying a counter based on a number of the common set of pixels;

instructing the display controller to perform a flash update of the electronic paper display device at least partly in response to determining that the value of the counter satisfies a changed pixel threshold.

24. The electronic book reader of claim 23, wherein the acts further comprise instructing the display controller to perform the flash update of the electronic paper display device at least partly in response to determining that a temperature associated with the electronic paper display device satisfies a temperature threshold.

25. The electronic book reader of claim 23, wherein the acts further comprise resetting the value of the counter after performing the flash update.

26. The electronic book reader of claim 23, wherein the acts further comprise instructing the display controller to perform the flash update of the electronic paper display device at least partly in response to determining that a size of an image to be displayed by the electronic paper display device is greater than a particular size.

27. The electronic book reader of claim 23, wherein performing the flash update reduces ghosting effects of the electronic paper display device.

* * * * *

UNITED STATES PATENT AND TRADEMARK OFFICE

CERTIFICATE OF CORRECTION

PATENT NO. : 8,803,794 B1
APPLICATION NO. : 13/424060
DATED : August 12, 2014
INVENTOR(S) : Froment et al.

It is certified that error appears in the above-identified patent and that said Letters Patent is hereby corrected as shown below:

In the Claims,

Column 13, line 29, change “flashier” to -- flashing --.

Signed and Sealed this
Sixth Day of January, 2015

Michelle K. Lee
*Deputy Director of the United States Patent and Trademark Office*